J. R. KONETSKY.
BRAKE PEDAL MOUNTING.
APPLICATION FILED FEB. 7, 1916.
1,218,415.
Patented Mar. 6, 1917.
2 SHEETS—SHEET 2.
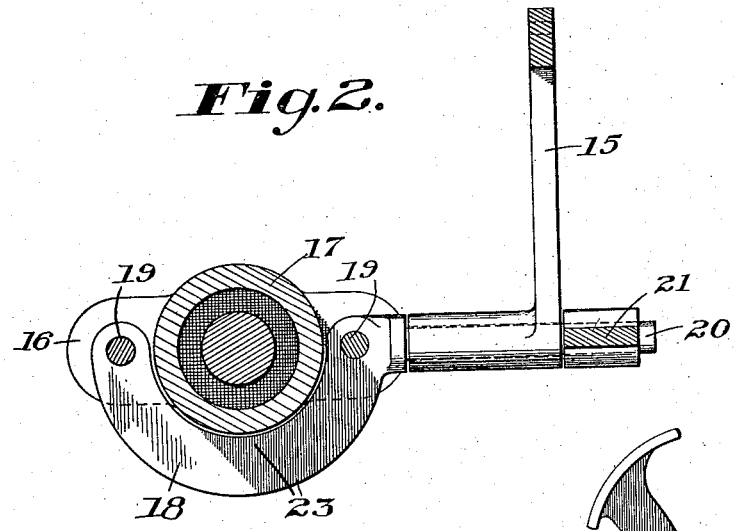
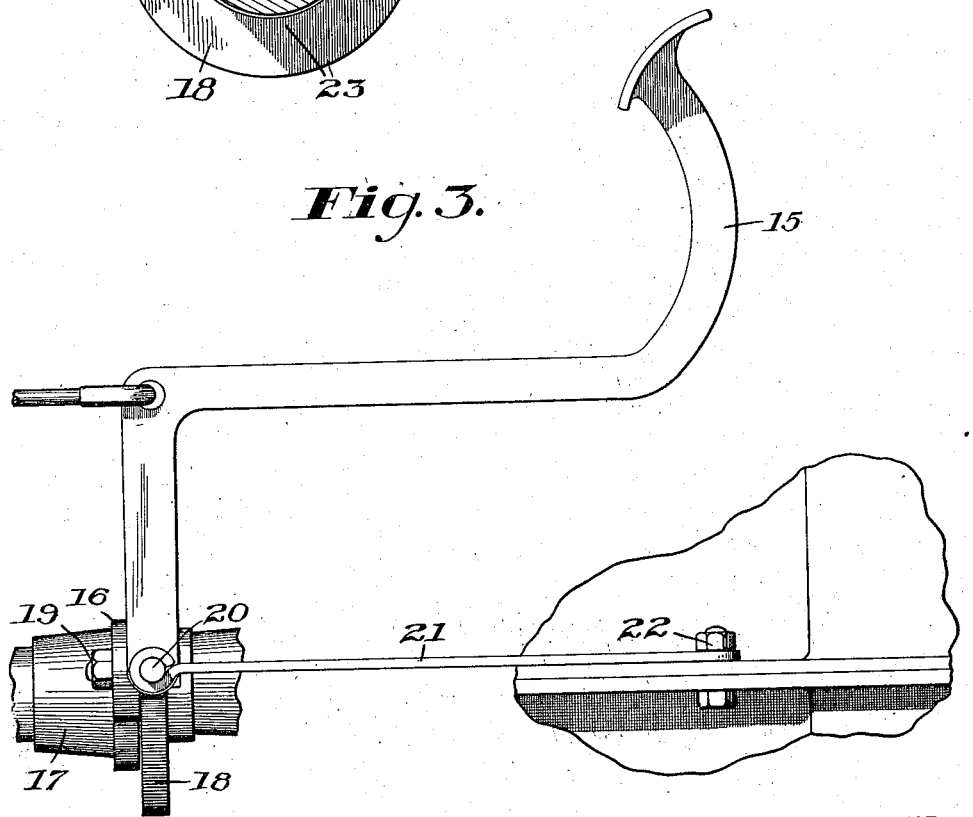
WITNESSES:
INVENTOR
John R. Konetsky.

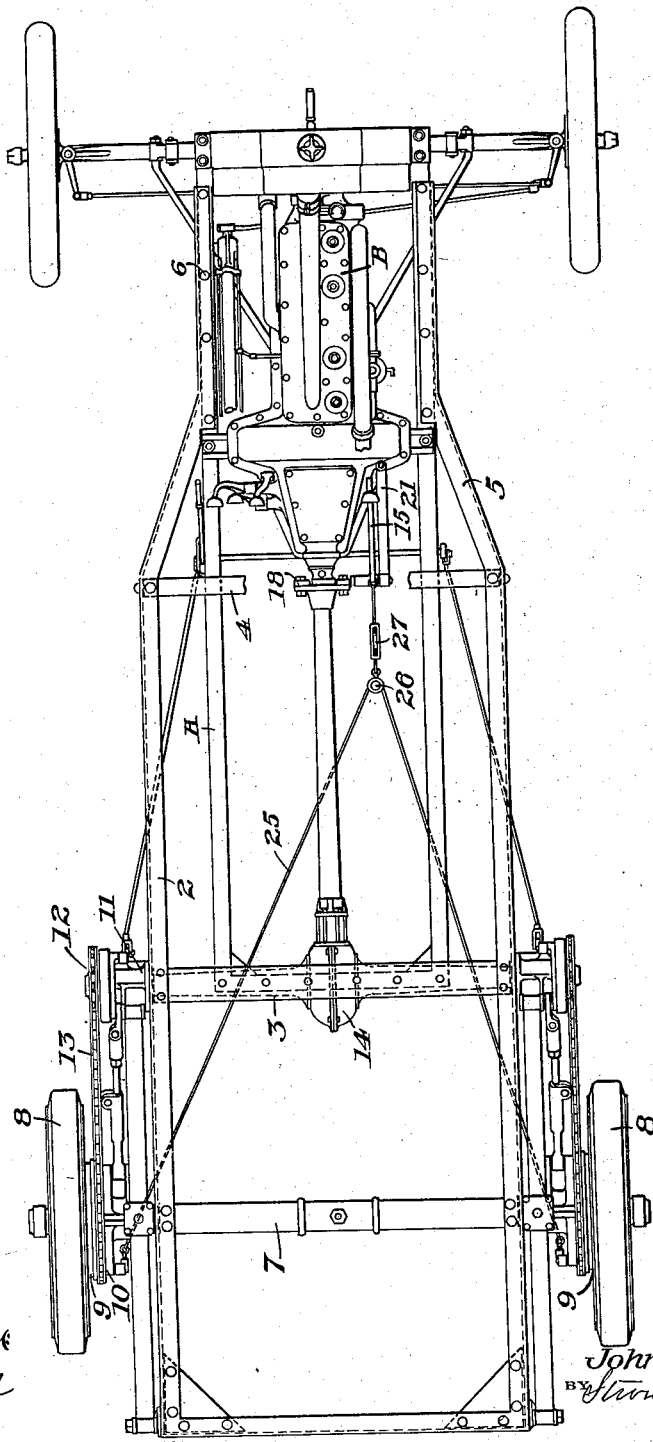

UNITED STATES PATENT OFFICE.

JOHN R. KONETSKY, OF SAN FRANCISCO, CALIFORNIA, ASSIGNOR TO RALSTON IRON WORKS, OF SAN FRANCISCO, CALIFORNIA, A CORPORATION OF CALIFORNIA.

BRAKE-PEDAL MOUNTING.

1,218,415.  Specification of Letters Patent.  Patented Mar. 6, 1917.

Application filed February 7, 1916. Serial No. 76,595.

*To all whom it may concern:*

Be it known that I, JOHN R. KONETSKY, a citizen of the United States, residing in the city and county of San Francisco and State of California, have invented new and useful Improvements in Brake-Pedal Mountings, of which the following is a specification.

This invention relates to a Ford car which has been rebuilt to form a truck, and the object of the present invention is to provide a simple, substantial, easily applied bracket member for the reception of a brake pedal to be used in connection with a pair of brakes mounted on the rear driving wheels of the truck. Further objects will hereinafter appear.

The invention consists of the parts and the construction and combination of parts, as hereinafter more fully described and claimed, having reference to the accompanying drawings, in which—

Figure 1 is a plan view of a Ford car showing it rebuilt to serve as a truck.

Fig. 2 is an enlarged end elevation of Fig. 1, partly in section.

Fig. 3 is a side elevation of Fig. 2.

Referring to the drawings in detail, A indicates the main frame of a Ford car and 2 an extension frame which in this instance is secured to the main frame by a pair of cross-bars 3 and 4, and by bending and extending the forward ends of the extension frame inwardly, as at 5, to permit said ends to be secured, as at 6. 7 indicates a rear driving axle provided with wheels 8 and brake drums 9, exterior of which is secured sprocket wheels 10 to which power is transmitted from the rear driving shaft of the Ford car, which in this instance serves as a jack-shaft 11, by means of the sprocket wheels 12 secured on the ends of the jack shaft and chains 13. The jack-shaft is in this instance secured in any suitable manner to the rear end of the main frame A and the extension frame 2, as this does not form any part of the present invention.

Power is transmitted from the engine B through the usual transmission and propeller shaft to the jack-shaft through the usual differential inclosed by the housing 14. The main purpose of the present invention is to provide a novel form of bracket and mounting for a brake pedal, indicated at 15, which is employed for the purpose of operating the brakes 9 secured upon the wheels 8. This is accomplished as follows:

Secured upon the flanged end 16 of the driving shaft 17 is a bracket member 18. This is secured by means of a pair of bolts 19 which extend through the bolt holes in the flange 16, and formed integral with the bracket 18 is an outwardly extending spindle or pin 20, which is adapted to receive the brake pedal 15. For the purpose of further securing the bracket 18, a brace rod 21 has been employed, one end of this rod is secured to the outer end of the pin 20 and the opposite end is secured to the cover section of the transmission case, as at 22. The bracket 18 is curved, as at 23 to permit it to extend under the propeller shaft tube 17 and is in this manner easily applied and rigidly secured by the bolts 19. Any racking movement or bending of the extension pin 20 formed or otherwise secured on bracket 18 is prevented by the provision of the brace rod 21. The brake pedal may be shaped in any suitable manner, but preferably as shown in Fig. 3 and is in this instance attached to the brakes 9 by means of a flexible equalizing chain or cable 25, a pulley 26 and a turn-buckle 27 which is provided for the purpose of taking up any slack between the brake pedal and the brakes proper.

The whole invention resides in the construction of the bracket 18 and the means for securing same. The brakes 9, may, therefore, be constructed in any suitable manner and any connection may be made between the brakes and the brake pedal 15.

The materials and finish of the bracket and the means for securing same may be varied to suit the experience and judgment of the manufacturer.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. The combination with the flanged end of a propeller shaft tube, of a bracket member adapted to be secured to the flanged end of the tube, and a brake pedal pivotally mounted on the bracket.

2. The combination with the flanged end of a propeller shaft tube, of a bracket member adapted to be secured to the flanged end of the tube, a stud pin secured on the bracket member, and a brake pedal pivotally mounted on said pin.

3. The combination with the flanged end of a propeller shaft tube, of a bracket member adapted to be secured to the flanged end of the tube, a stud pin secured on the bracket member, a brake pedal pivotally mounted on said pin, and means for securing the pedal against endwise movement on the pin.

4. A brake pedal mounting comprising a bracket member adapted to be secured to the flanged end of an automobile propeller shaft tube, a stud-pin secured on the bracket member, a brake pedal pivotally mounted on said pin, and a brace rod adapted to be secured to the outer end of the pin at one end and at the opposite end some other suitable support to secure the pedal against endwise movement and to strengthen the bracket and pin as a whole.

In testimony whereof I have hereunto set my hand in the presence of two subscribing witnesses.

JOHN R. KONETSKY.

Witnesses:
JOHN H. HERRING,
W. W. HEALEY.

Copies of this patent may be obtained for five cents each, by addressing the "Commissioner of Patents, Washington, D. C."